US008554536B2

(12) United States Patent
Adelman et al.

(10) Patent No.: US 8,554,536 B2
(45) Date of Patent: Oct. 8, 2013

(54) INFORMATION OPERATIONS SUPPORT SYSTEM, METHOD, AND COMPUTER PROGRAM PRODUCT

(75) Inventors: Steven P. Adelman, Portland, OR (US); Thomas R. Lehnert, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 919 days.

(21) Appl. No.: 11/614,675

(22) Filed: Dec. 21, 2006

(65) Prior Publication Data

US 2007/0277237 A1    Nov. 29, 2007

Related U.S. Application Data

(60) Provisional application No. 60/802,785, filed on May 24, 2006.

(51) Int. Cl.
| | |
|---|---|
| G06F 9/44 | (2006.01) |
| G06F 13/10 | (2006.01) |
| G06F 13/12 | (2006.01) |
| G06F 9/455 | (2006.01) |
| G06F 9/00 | (2006.01) |
| G06F 15/16 | (2006.01) |
| G06F 17/00 | (2006.01) |
| G06F 11/00 | (2006.01) |
| G06F 12/14 | (2006.01) |
| G06F 12/16 | (2006.01) |

(52) U.S. Cl.
USPC ............... 703/27; 703/21; 726/13; 726/23

(58) Field of Classification Search
USPC ................. 703/21, 27; 726/13, 23
See application file for complete search history.

(56) References Cited

U.S. PATENT DOCUMENTS

| | | | | |
|---|---|---|---|---|
| 5,821,937 A | * | 10/1998 | Tonelli et al. | 715/853 |
| 6,229,540 B1 | * | 5/2001 | Tonelli et al. | 715/735 |
| 6,971,028 B1 | * | 11/2005 | Lyle et al. | 726/25 |
| 7,379,857 B2 | * | 5/2008 | Piesco | 703/21 |
| 8,250,654 B1 | * | 8/2012 | Kennedy et al. | 726/22 |
| 2002/0023227 A1 | * | 2/2002 | Sheymov et al. | 713/201 |
| 2002/0194495 A1 | * | 12/2002 | Gladstone et al. | 713/200 |
| 2003/0212908 A1 | * | 11/2003 | Piesco | 713/201 |
| 2004/0098623 A1 | * | 5/2004 | Scheidell | 713/201 |
| 2004/0193912 A1 | * | 9/2004 | Li et al. | 713/200 |
| 2004/0250114 A1 | * | 12/2004 | Parekh et al. | 713/201 |
| 2005/0027851 A1 | * | 2/2005 | McKeown et al. | 709/224 |
| 2005/0177871 A1 | * | 8/2005 | Roesch et al. | 726/13 |
| 2006/0034305 A1 | * | 2/2006 | Heimerdinger et al. | 370/408 |

(Continued)

OTHER PUBLICATIONS

Jelena Mirkovic, "D-WARD: Source-End Defense Against Distributed Denial-of-Service Attacks",Thesis 2003, University of California, Los Angeles.*

(Continued)

*Primary Examiner* — Omar Fernandez Rivas
*Assistant Examiner* — Angel Calle

(57) ABSTRACT

A system, method and computer program product are provided for creation of a network training environment that simulates a large network as a training target and using simulation and virtual network technologies together with actual network resources to teach computer network exploitation and computer network attack techniques in training exercises for persons responsible for safeguarding networks and for probing and attacking others' networks. The system, method, and computer program product further support integration of real hosts for more realistic exercises.

19 Claims, 17 Drawing Sheets

(56) References Cited

U.S. PATENT DOCUMENTS

2006/0101516 A1* 5/2006 Sudaharan et al. ............. 726/23
2006/0191010 A1* 8/2006 Benjamin ....................... 726/23
2006/0212932 A1* 9/2006 Patrick et al. .................. 726/11
2008/0072321 A1* 3/2008 Wahl .............................. 726/22

OTHER PUBLICATIONS

Vikas Jayawal, William Yurcik and David Doss, "Internet Hack Back: Counter Attacks as Self-Defense or Vigilantism?", Proceedings of the IEEE International Symposium on Technology and Society (ISTAS), Raleigh NC. USA, Jun. 2002.*

Dragos Ruiu, "Hack and Counter-Hack, Active Forensics: Tracking that Intruder", 2001, http://web.archive.org/web/20030908075540/http://staff.washington.edu/dittrich/misc/active-forensics.txt.*

Colonel Daniel J. Busby, "Peacetime Use of Computer Network Attack", USAWC Class of 2000.*

Hassan Artail, "A hybrid honeypot framework for improving intrusion detection systems in protecting organizational networks", available online, May 6, 2006.* lyad Kuwatly, "A Dynamic Honeypot Design for Instrusion Detection", IEEE, 2004.*

* cited by examiner

INFORMATION OPERATIONS SUPPORT SYSTEM, METHOD, AND COMPUTER PROGRAM PRODUCT

CROSS-REFERENCE TO RELATED APPLICATIONS

The present application claims priority from U.S. Provisional Application No. 60/802,785 filed May 24, 2006, which is fully incorporated by reference and made a part hereof.

This application also fully incorporates by reference and makes a part hereof U.S. patent application Ser. No. 10/978,765; published as U.S. Patent Application Publication No. US 2005-0177871 A1, which was filed on Nov. 1, 2004 and published on Aug. 11, 2005; and U.S. patent application Ser. No. 09/548,547, which was filed on Apr. 13, 2000 and has not been published.

FEDERALLY SPONSORED RESEARCH OR DEVELOPMENT

This invention was made with United States Government support under H98230-05-C-0652 awarded by National Security Agency. The United States Government has certain rights in the invention.

BACKGROUND INFORMATION

Intrusion and Misuse Deterrence Systems (IMDS), such as the type disclosed by U.S. patent application Ser. Nos. 09/548,547 and 10/978,765, previously incorporated herein, and similar systems are commonly known as honeynets and typically operate within an information systems network based on Internet Protocol (IP) communications. IMDS include a means for simulating from a single host the network responses of an array of information systems. Information operations technicians (IOTs) are responsible for safeguarding their organization's networks including the design and deployment of IMDS and also for probing and attacking opponents' networks. The networks they encounter can be very complex, containing more than 1000 different types of devices arranged in an unlimited number of topologies. To carry out their responsibilities IOTs must be proficient in the use of network probing and analysis tools. To become proficient, IOTs in training need hands-on experience with their tools. Ideally such training would be conducted on a variety of large, complex networks. The principal training environments are (1) the Internet and (2) existing operational networks. Both approaches have obvious limitations. A third approach—building a dedicated private network solely for training purposes—can be effective but prohibitively expensive. It would therefore be desirable to provide a dedicated, relatively inexpensive network environment that can be configured to support a wide range of training activities.

BRIEF DESCRIPTION OF THE DRAWING(S)

DETAILED DESCRIPTION OF EXEMPLARY EMBODIMENTS

Figure 1A:
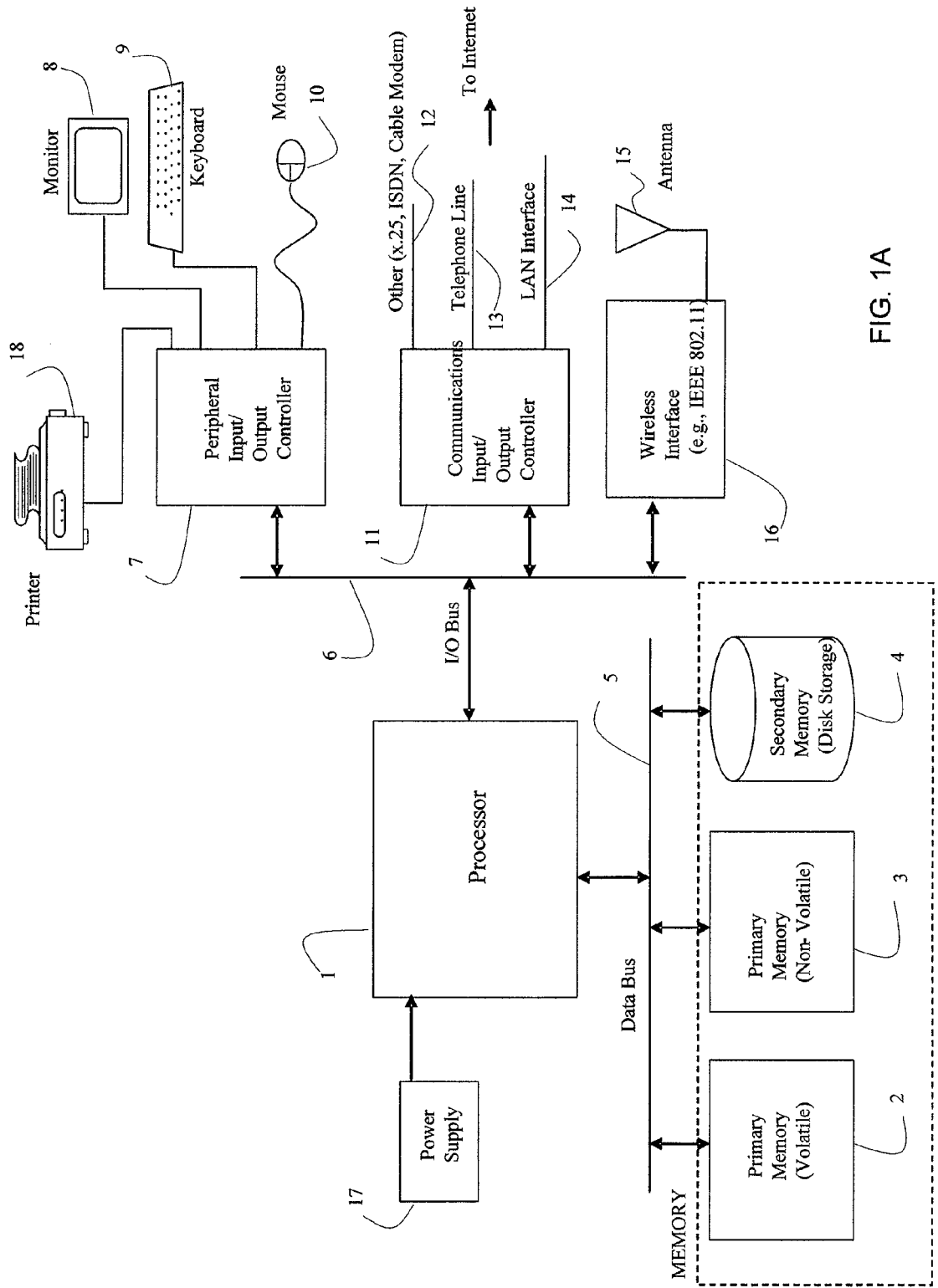
FIG. 1A illustrates a computing device consistent with exemplary embodiments.

Exemplary embodiments are described hereinafter with reference to the accompanying drawings, in which exemplary embodiments and examples are shown. Like numbers refer to like elements throughout.

As will be appreciated by one skilled in the art, exemplary embodiments may be implemented as a method, a data processing system, or a computer program product. Accordingly, the exemplary embodiment may take the form of an entirely hardware embodiment, an entirely software embodiment, or an embodiment combining software and hardware aspects. Furthermore, implementations of the exemplary embodiment may take the form of a computer program product on a computer-readable storage medium having computer-readable program instructions (e.g., computer software) embodied in the storage medium. More particularly, implementations of the exemplary embodiments may take the form of web-implemented computer software. Any suitable computer-readable storage medium may be utilized including hard disks, CD-ROMs, optical storage devices, or magnetic storage devices.

The exemplary embodiments are described below with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks.

The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In the exemplary embodiments referenced herein, a "computer," "computing device," or "workstation" may be interchangeably referenced. Such computer may be, for example, a mainframe, desktop, notebook or laptop, a hand held device such as a data acquisition and storage device, or it may be a processing device embodied within another apparatus such as, for example, a set top box for a television system or a wireless telephone. In some instances, the computer may be a terminal used to access data or processors over a network.

Turning to FIG. 1A, one embodiment of a computing device is illustrated that can be used to practice aspects of the exemplary embodiment. In FIG. 1A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS-422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or standard 3G wireless telecommunications protocols, such as CDMA2000 1xEV-DO, GPRS, W-CDMA, or other protocol.

Figure 1B:
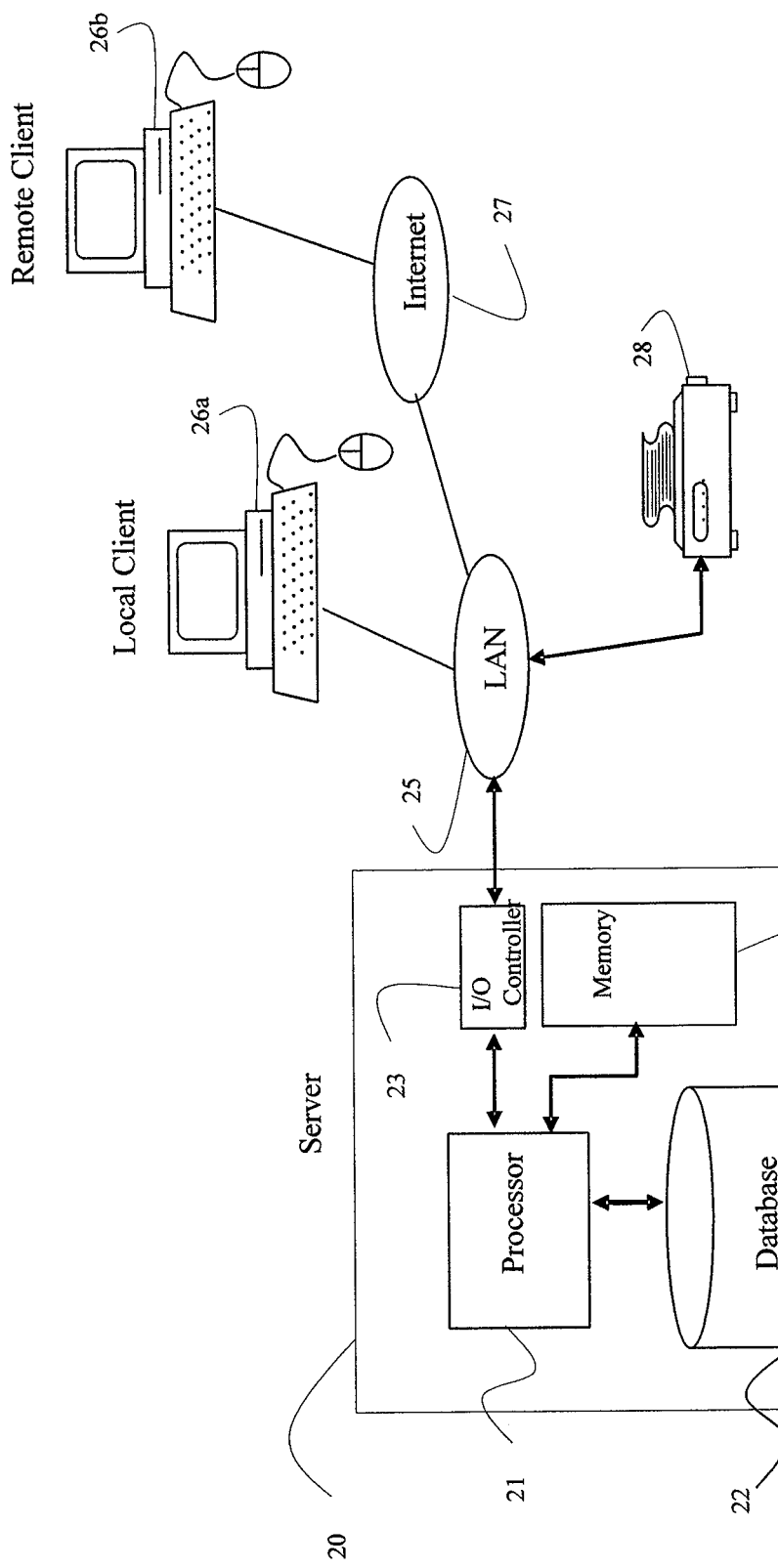
FIG. 1B illustrates a processing system having a distributed communication and processing architecture consistent with exemplary embodiments.

An alternative embodiment of a processing system that may be used is shown in FIG. 1B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Those skilled in the art of data networking will realize that many other alternatives and architectures are possible and can be used to practice the exemplary embodiments.

As noted above, IOTs in training should acquire hands-on experience with 10 tools and techniques in large, complex networks. Using existing operational or public networks for hands-on exercises provides many challenges. On the other hand, building a large, private network solely for training purposes is prohibitively expensive. Exemplary embodiments resolve these challenges by providing a simulated network environment that is configurable for a wide variety of training exercises and supports the integration of real hosts for in-depth exercises. An exemplary Information Operations Support System (IOSS): accommodates one or more students, providing them with a variety of target networks on which they can practice forensic and defensive techniques; creates an environment that can be dynamically configured to resemble any number of real world examples; provides logs that can be used to evaluate students' performance; supports multiple target-network devices; and emulates TCP/IP service interfaces for multiple services implemented at various release levels on different operating systems.

Figure 2:
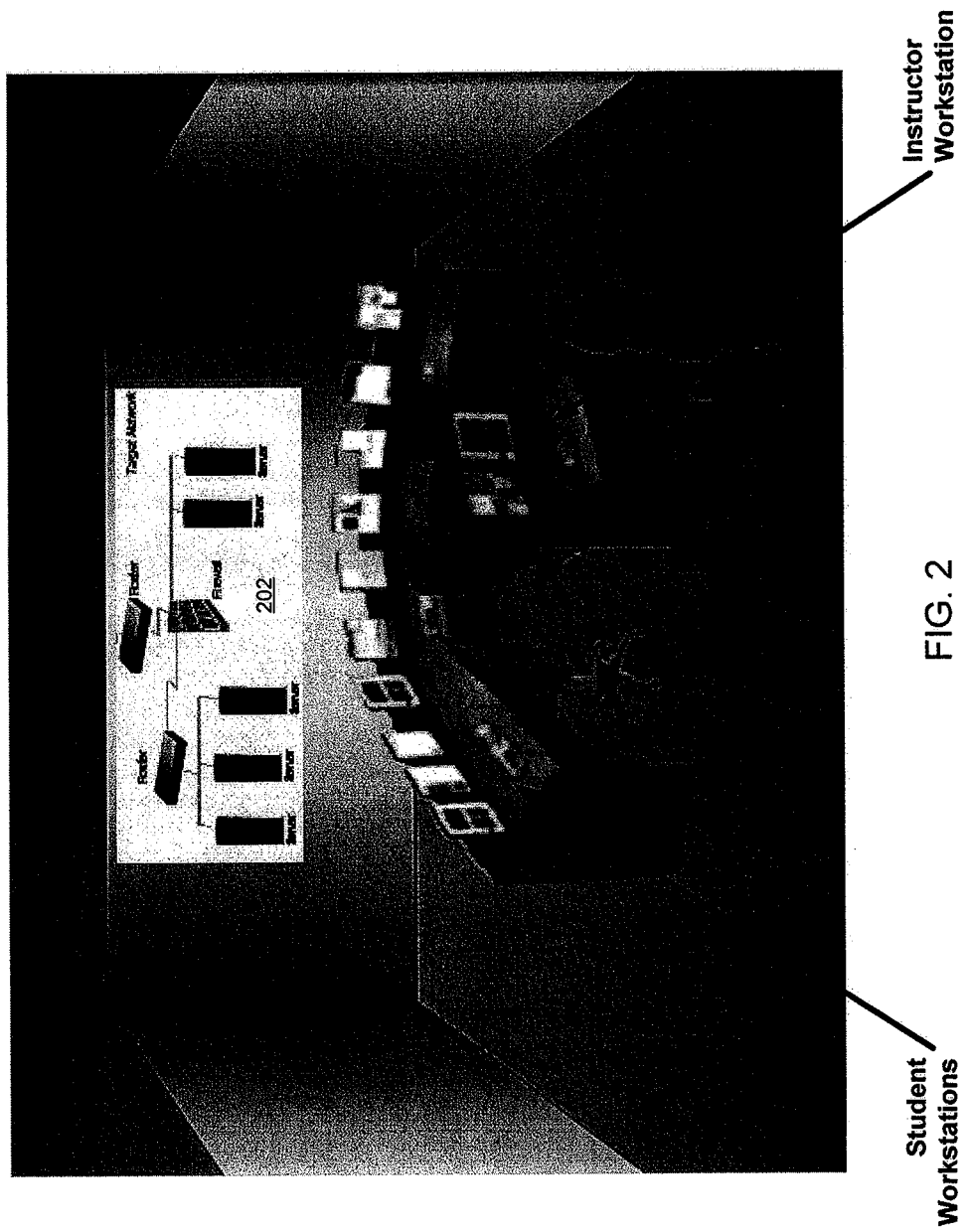
FIG. 2 illustrates an exemplary embodiment where students and instructors are connected to a network simulator.

FIG. 2 is a conceptual rendering of an exemplary embodiment of an IOSS where students, e.g., IOTs in training, and instructors are connected to a network simulator. In this scenario, an instructor creates a target network 202 from real and simulated devices using network simulator configuration tools. In one embodiment, the network simulator performs autodiscovery of real devices attached to the simulator to facilitate the creation of target networks. Students then use forensic tools to probe the target network and perform other information operations exercises. Though shown in FIG. 2 as locally situated, in other embodiments students and instructors may be located remote from one another and connected through network connections.

Figure 3:
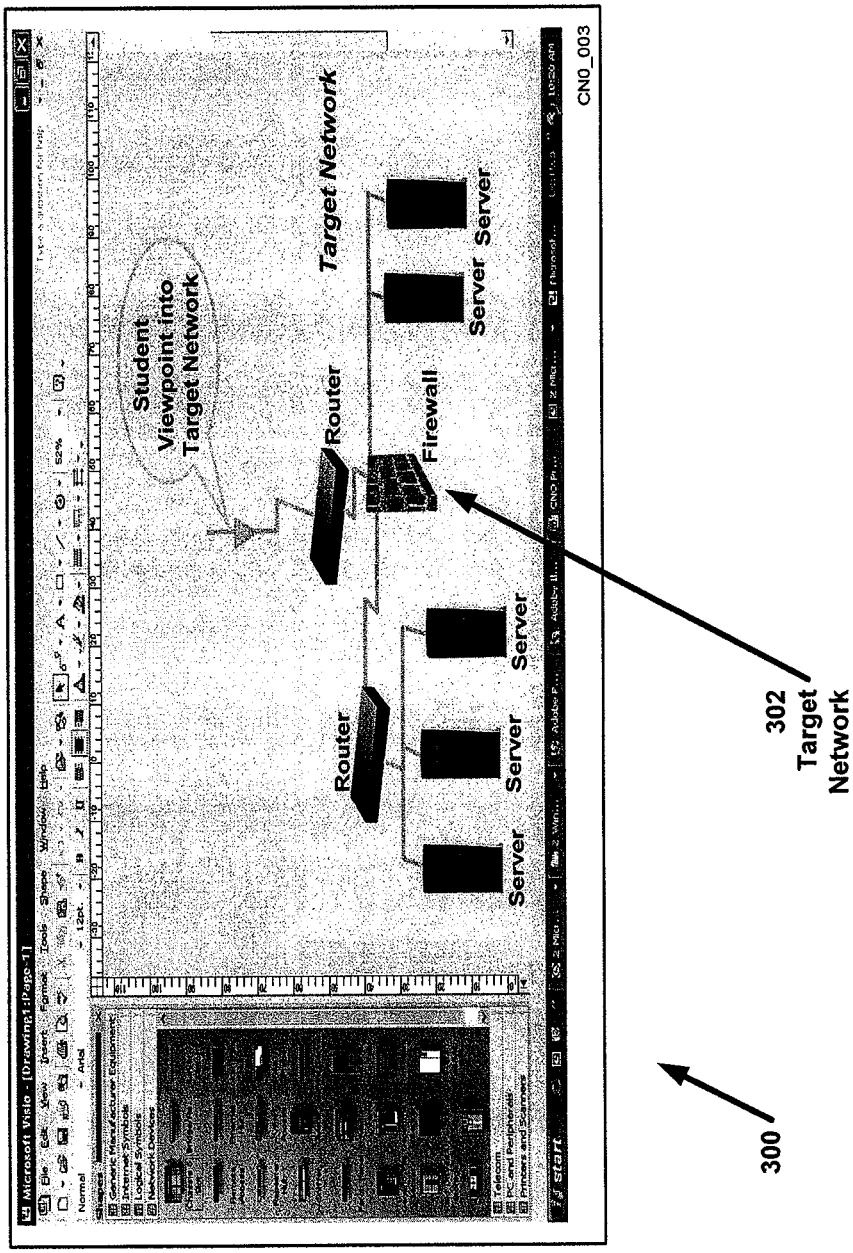
FIG. 3 illustrates an exemplary screen shot of an embodiment of a graphical user interface for creating a target network, as may be shown on a display.

FIG. 3 illustrates an exemplary screen shot 300 of an embodiment of a graphical user interface for creating a target network 302, as may be shown on a display. The network simulator used to create the exemplary screen 300 provides an intuitive, easy-to-use means for the instructor to create a target network 302, such as illustrated in FIG. 3.

A target network 302 can be configured in the graphical user interface by dragging and dropping icons on the network map. Links among network elements can be configured with user-defined latency values. The simulator checks a completed design for errors to ensure, for example, that there are no open-ended links. Validated designs can be deployed to the simulator.

The student workstation works with IO tools, including, for example, Nmap, Xprobe, Ethereal and others. Nmap is free port scanning software distributed by Insecure.Org and designed to detect open ports on a target computer, determine which services are running on those ports, and infer which operating system (OS) the computer is running (this is also known as fingerprinting). It is used for penetration testing and general computer security. Ethereal is a protocol analyzer, or "packet sniffer" software, used for network troubleshooting, analysis, software and protocol development, and education. Xprobe provides a remote OS identification using Internet Control Message Protocol (ICMP) packets that allows a user to determine what operating system is running on a remote host. It sends several packets to a host and analyzes the returned ICMP packets. The tool automates a logic of OS fingerprinting methods called "X". Xprobe's functionality is comparable to the OS fingerprinting feature in Nmap. The instructor observes and assesses the student's skill level and understanding. The system maintains a log of all activity that can be reviewed at the end of an exercise.

Figure 4:
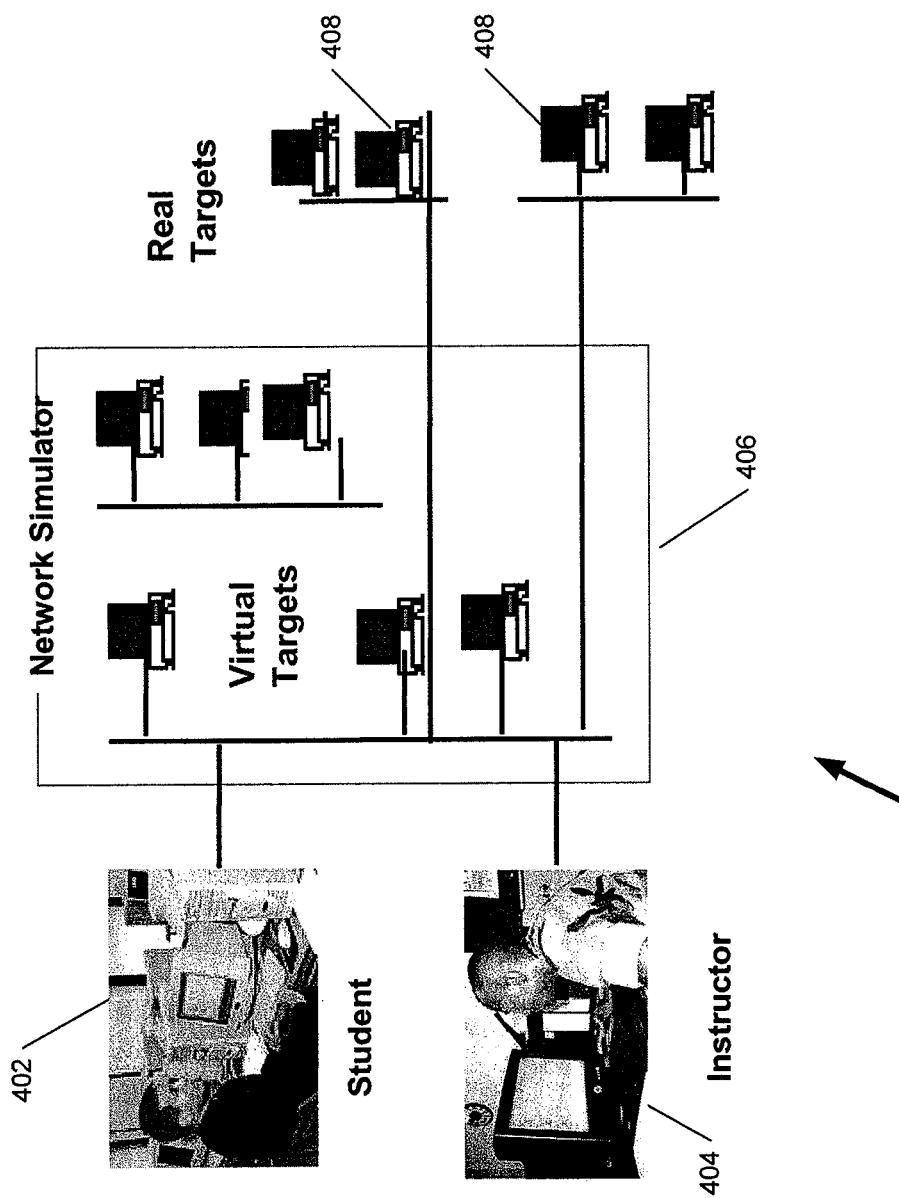
FIG. 4 illustrates the components that compromise an exemplary embodiment of an information operations support system.

FIG. 4 illustrates the components that comprise an exemplary embodiment of an IOSS. The components include one or more student workstations 402; one or more instructor workstations 404; a network simulator 406; and real targets 408. Student workstations 402 and instructor workstations 404 provide access to the network simulator 406, mechanisms for creating and instantiating target networks, and tools for probing them. The network simulator 406 creates a target network environment, which includes real and simulated targets. Real targets 408 are comprised of a variety of network devices that can be incorporated into a target network to provide fully functional targets for probing.

Figure 5:
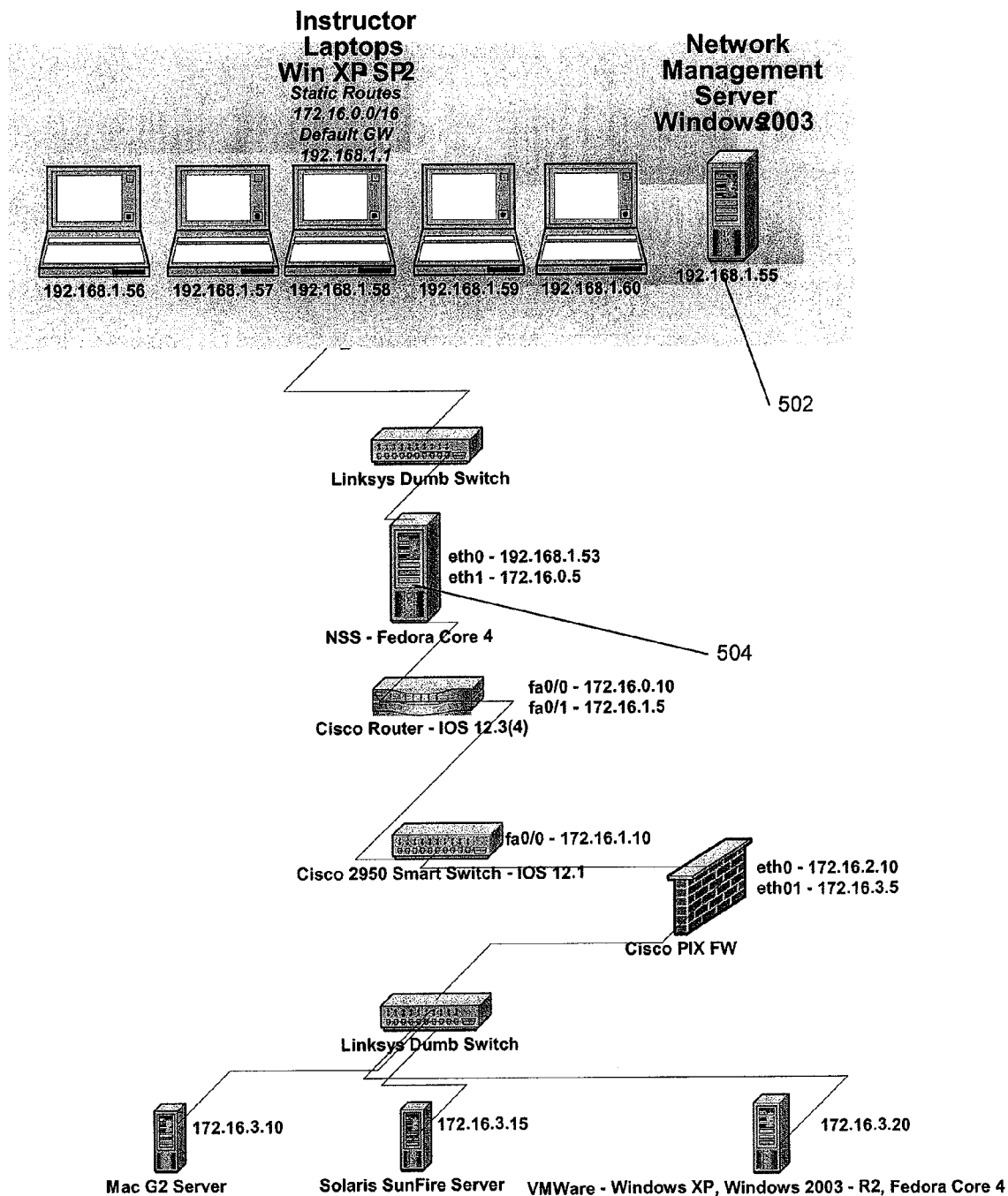
FIG. 5 is an exemplary hardware configuration for implementing an embodiment of an information operations support system.

FIG. 5 is an exemplary hardware configuration for implementing an embodiment of an information operations support system, in which the network simulator includes a network management server and a network simulation server. In the embodiment of FIG. 5, the network management server (NMS) 502 can operate on a Windows Server 2003 operating system as available from Microsoft Corporation of Redmond, Wash., and the network simulation server (NSS) 504 can operate on Fedora Core 4 available from Red Hat, Inc. of Raleigh, N.C., as well as other platforms.

Figure 6:
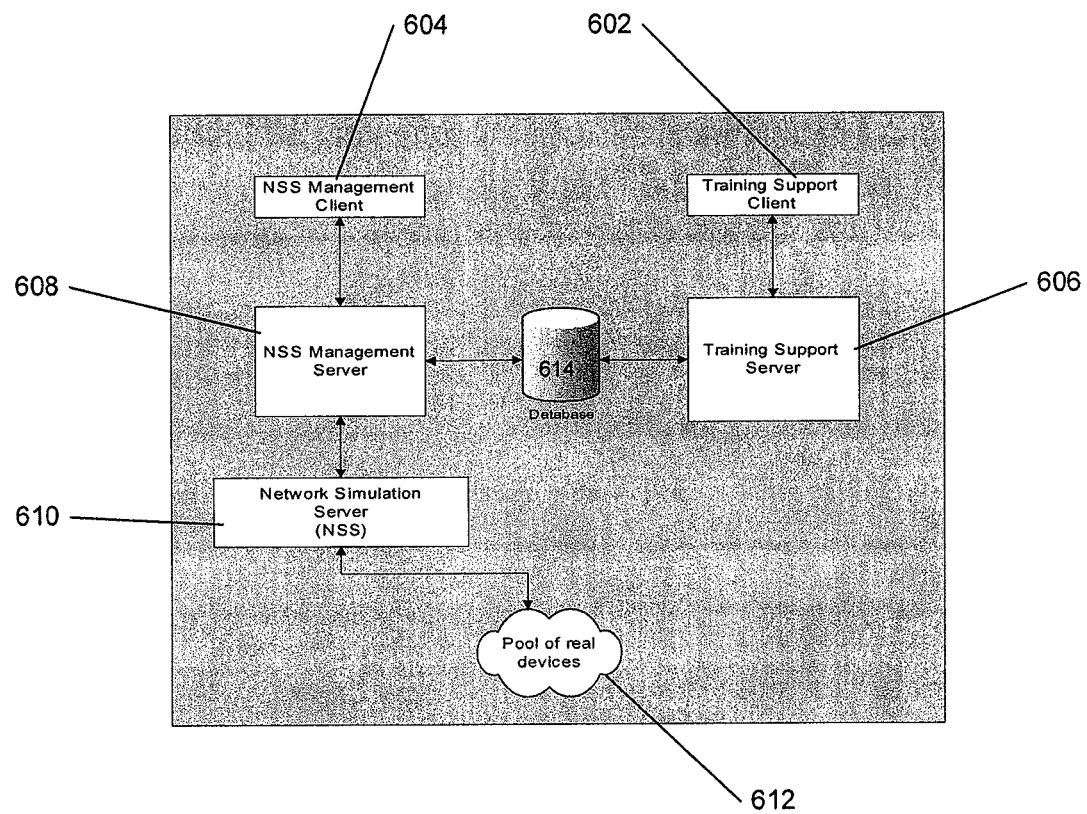
FIG. 6 illustrates the functional components in an exemplary embodiment of an information operations support system.

FIG. 6 illustrates the functional components in an exemplary embodiment of an information operations support system. These components include a training support client 602; a network management client 604; a training support server 606; a NSS management server 608; a network simulation server 610; real devices 612; and a database 614. The training support client 602 provides a user interface for classroom tools. The network management client 604 provides a user interface for target network design and NSS control. The training support server 606 provides logging and log review utilities. The NSS management server 608 configures and deploys target networks. The network simulation server (NSS) 610 implements the target network, including the virtual targets and all connecting links. The real devices 612 are a pool of targets for in-depth probing.

Clients 602, 604 operate on instructor and student workstations. The network management client 604 provides a user interface for network design, network design storage and retrieval, NSS control, packet viewing, and error logging. In one embodiment, the training support server 606 and the NSS management server 608 share a single hardware platform, though separate platforms are also contemplated. The NSS 610 generally operates on a dedicated platform, though a shared platform is also contemplated.

Figure 7:
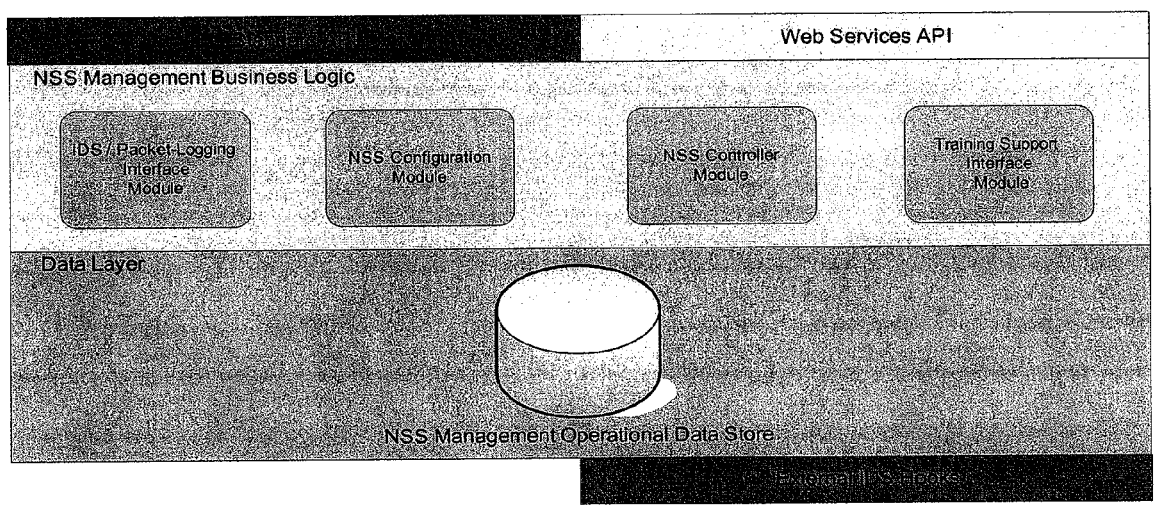
FIG. 7 illustrates the architecture of the network management server (NMS) in an exemplary embodiment.

FIG. 7 illustrates the architecture of the network management server (NMS) 700 in an exemplary embodiment. The functions of the network management server 700 include network simulation configuration support, network simulation persistence, network simulation instantiation, student-log correlation, and intrusion detection system (IDS)/packet-logging interface.

Figure 8:
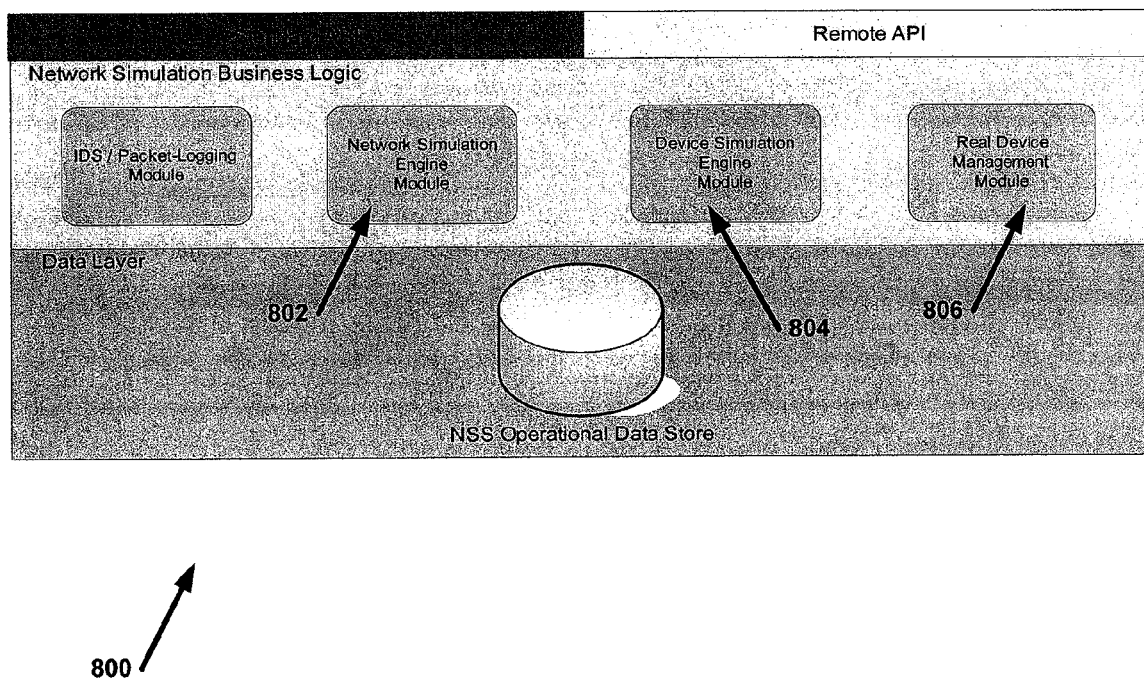
FIG. 8 illustrates the architecture of the network simulation server in an exemplary embodiment.

FIG. 8 illustrates the architecture of the network simulation server 800 in an exemplary embodiment. The network simulation server (NSS) 800 is generally a single server that creates a plurality (e.g., up to 254) of virtual hosts and integrates those hosts with a set of real network devices. The NSS's 800 management of packet flow includes routing that can incorporate user-defined link property values as described below. The combination of virtual and real hosts and authentic routing actions creates an environment with the look, feel, and depth of a real wide-area network. In the exemplary embodiment of FIG. 8, the NSS's 800 simulation technology is adapted from that of an IMDS disclosed in U.S. patent application Ser. Nos. 09/548,547 and 10/978,765, previously incorporated herein. IMDS systems like that disclosed in U.S. patent application Ser. Nos. 09/548,547 and 10/978,765 are commonly known as honeynets and typically operate within an information systems network based on Internet Protocol (IP) communications. IMDS includes a mechanism for simulating from a single host the network responses of an array of information systems.

Components that comprise and perform functions for the NSS 800 include: a network simulation engine 802; a device simulation engine 804 that performs the functions of pseudo-services, pseudo-routing, and fingerprinting; a real device management module 806 that performs the functions of configuration verification and real-device/simulation-device integration; and an intrusion detection system (IDS)/packet logging module 808.

The network simulation engine (NSE) 802 receives a file containing an XML-coded version of the target network from the NMS 700. The file is converted to a route file that is used by the NSS 800 to control routing during a simulation. Routes may be selected based on the Djikstra shortest-path-first algorithm: If a design has multiple paths to a target, the shortest path will be chosen and represented; the other paths will be ignored. This mechanism is also used to create dynamic reconverging networks when a pseudo-network is altered by a student action.

The device simulation engine (DSE) 804 provides services that include pseudo-services, pseudo-routing and fingerprinting. Pseudo services are a set of TCP/IP services that are simulated for each network device. Pseudo routing is the routing of packets among simulated and real devices. Fingerprinting is a technique for identifying a host type by examining the responses it provides to a series of probes. Each of these services is described in more detail below.

Pseudo services are designed so that, for a particular host (operating system and release), the simulator will provide appropriate responses to a probe, such as an Nmap probe. The services and operating systems simulated in an exemplary embodiment include those identified in Table I, though it is to be appreciated that additional services and operating systems may be simulated in the future and some simulated services or operating systems may be discontinued as they become antiquated or no longer used. In addition to the basic services identified in Table I, the system can be enhanced to emulate higher-level services based on, for example, the Simple Network Management Protocol (SNMP) and Supervisory Control and Data Acquisition (SCADA) protocols. Such enhancements would enable the IOSS to interact with commercial network management systems in training scenarios such as those for IOTs, described above. Similar enhancements are envisioned related to medical, financial and other information systems.

TABLE I

Simulated TCP/IP Services and Operating Systems

| | Platform | | | | |
|---|---|---|---|---|---|
| Service | Linux | Windows | Solaris | Mac | Cisco |
| Apache | X | X | X | X | |
| Chargen | X | | X | | |
| Daytime | X | X | X | | |
| Echo | X | X | X | X | X |
| IIS | | X | | | |
| FTP | X | | X | X | |
| Telnet | X | | X | | X |

The DSE 804 intercepts incoming packets and examines them for probes, such as Nmap probes. When the DSE 804 detects a probing packet directed to an enabled host/service, it edits the outgoing response to look appropriate for the mimicked operating system. The fingerprinting process (described herein) may be used to detect Nmap probes, although comparable fingerprinting processes may be deployed to detect other types of probes.

Responses to probes, such as Nmap probes, are processed by simple executables, written, for example, in Perl and executed in user space. Response packets (or lack thereof) may be generated by processing a database, such as the Nmap database, of responses it expects from a particular host and manipulating outgoing response packets. Packets may be received from Linux IPtables and the ip_queue kernel modules.

The pseudo-routing function involves managing packet TTL (Time to Live) counts and latency. To provide realistic TTL counts in the outgoing packets the DSE 804 computes total number of hops along the path. If the TTL is sufficient, the DSE 804 decrements TTL, waits an amount of time equal to total latency and then passes the packet along. If the packet's TTL is insufficient, the DSE waits for the assigned latency to expire and then generates an Internet Control Message Protocol (ICMP) packet from the appropriate hop. Routes may be selected based on the Djikstra shortest-path-first algorithm: If a design has multiple paths to a target, the shortest path will be chosen and represented; the other paths will be ignored.

Fingerprinting is a means of identifying a host type by examining the responses it provides to a series of probes. For example, Nmap runs up to eight different tests to determine the type of host it is communicating with. The test results create a "fingerprint" of the host that can be used to determine operating system, release and hardware platform. Probes, such as Nmap probes, exploit subtle differences in the way that each operating system/hardware platform combination responds to incoming packet. There are, for example, differences in the way each operating system generates initial sequence numbers. Nmap, for example, takes advantage of this by sending a series of packets designed to reveal these differences.

A database included in scanning software source code, such as the Nmap source code, contains the fingerprints of the host types the software can identify. The DSE 804 reverse engineers that database to produce its responses to probes, such as Nmap probes, so as to appropriately mimic the responses of a desired operating system.

The real device management module 806 performs functions that include configuration verification and real-device/simulation-device integration. In configuration verification, real devices in a target network are configured as follows: IP forwarding is turned on; the NSS is given a route to the real device via the pool interface allowing simple pass-through routing; and pseudo-routing is processed before passing the packet on.

The intrusion detection system (IDS)/packet logging module 808 can, for example, log all packets using a network intrusion detection system and pass them to the NMS as pcap formatted streams that are stored for processing. Such a network intrusion detection system (e.g., the well known Snort system), can perform real-time traffic analysis and packet logging on IP networks. Such a system can perform protocol analysis, content searching/matching and can be used to detect a variety of attacks and probes, such as buffer overflows, stealth port scans, common gateway interface (CGI) attacks, server message block (SMB) probes, OS fingerprinting attempts, and more. pcap is an application programming interface for packet capturing. The implementation of pcap for Unix-like systems is known as libpcap; the Windows port of libpcap is called WinPcap. A user can then open these files using various tools, including the open source tool Ethereal (previously described). The user may also process the stored pcap files through a set of different IDS rules, e.g., Snort rules, allowing the user to effectively "see" what an IDS system would see if it were attached to different parts of the pseudo network.

Figure 9:
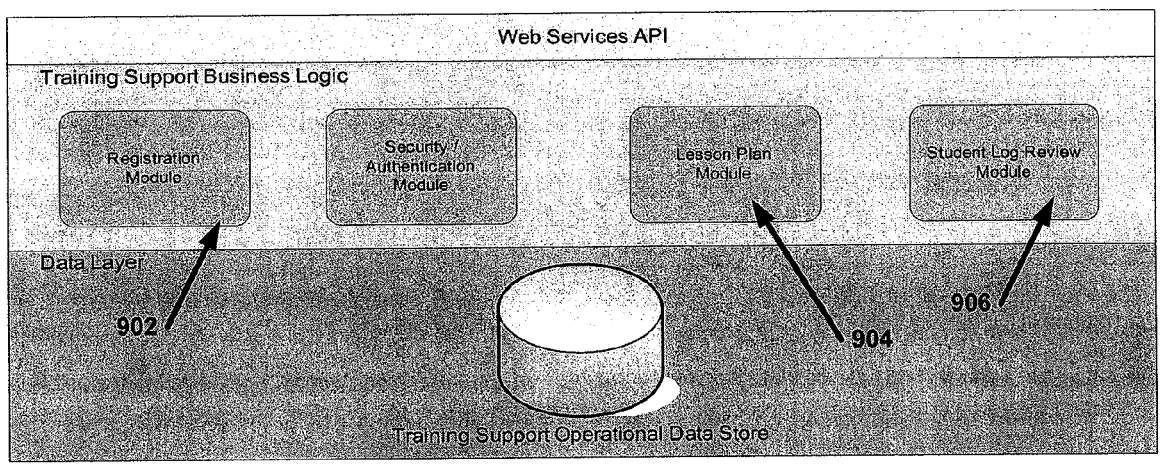
FIG. 9 illustrates the architecture of the training support server in an exemplary embodiment.

FIG. 9 illustrates the architecture of the training support server 900 in an exemplary embodiment. The training support client 602 operates on student and instructor workstations and provides the user interface for access to the training support server (TSS) 900 functionality. TSS functionality includes: student registration and authentication via a registration module 902; lesson plan support including lab worksheets and tests/quizzes via a lesson plan module 904; and student log review via a student log review module 906.

Figure 10A:
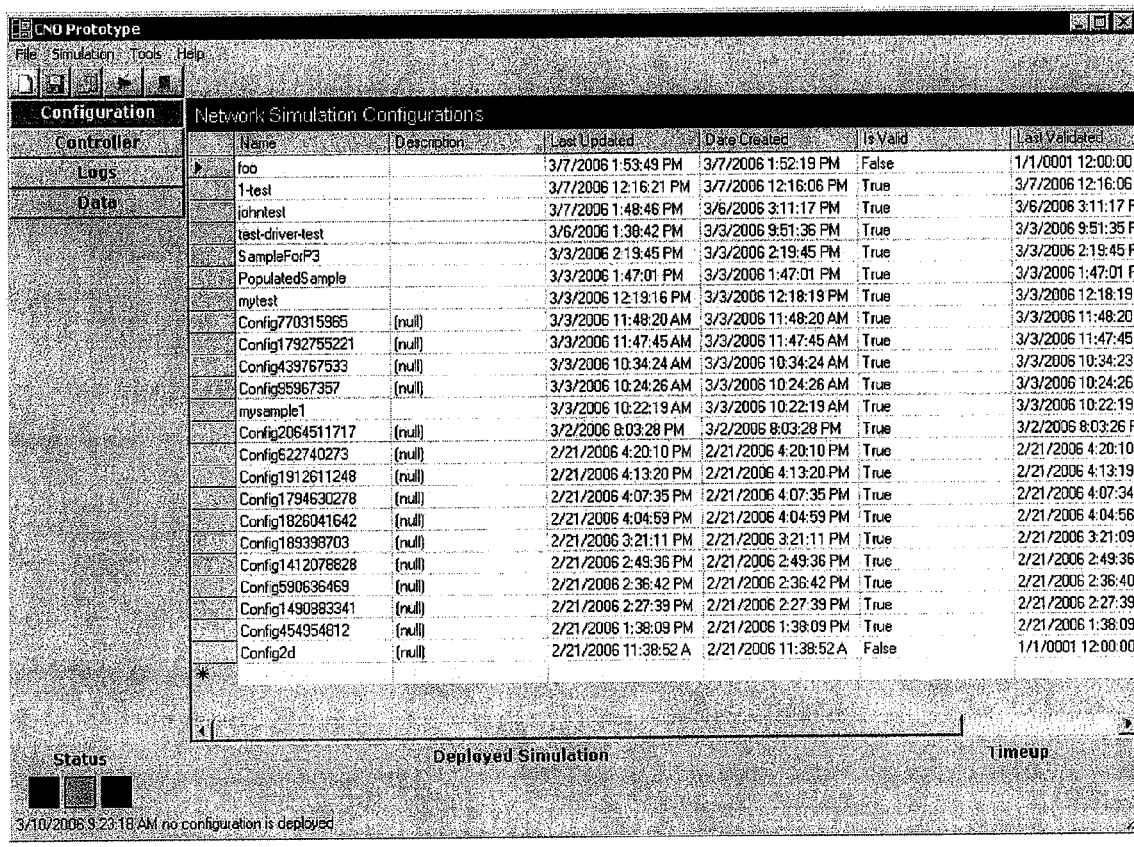
FIGS. 10A-10E illustrate a process for building a target network in an exemplary embodiment.
Figure 10B:
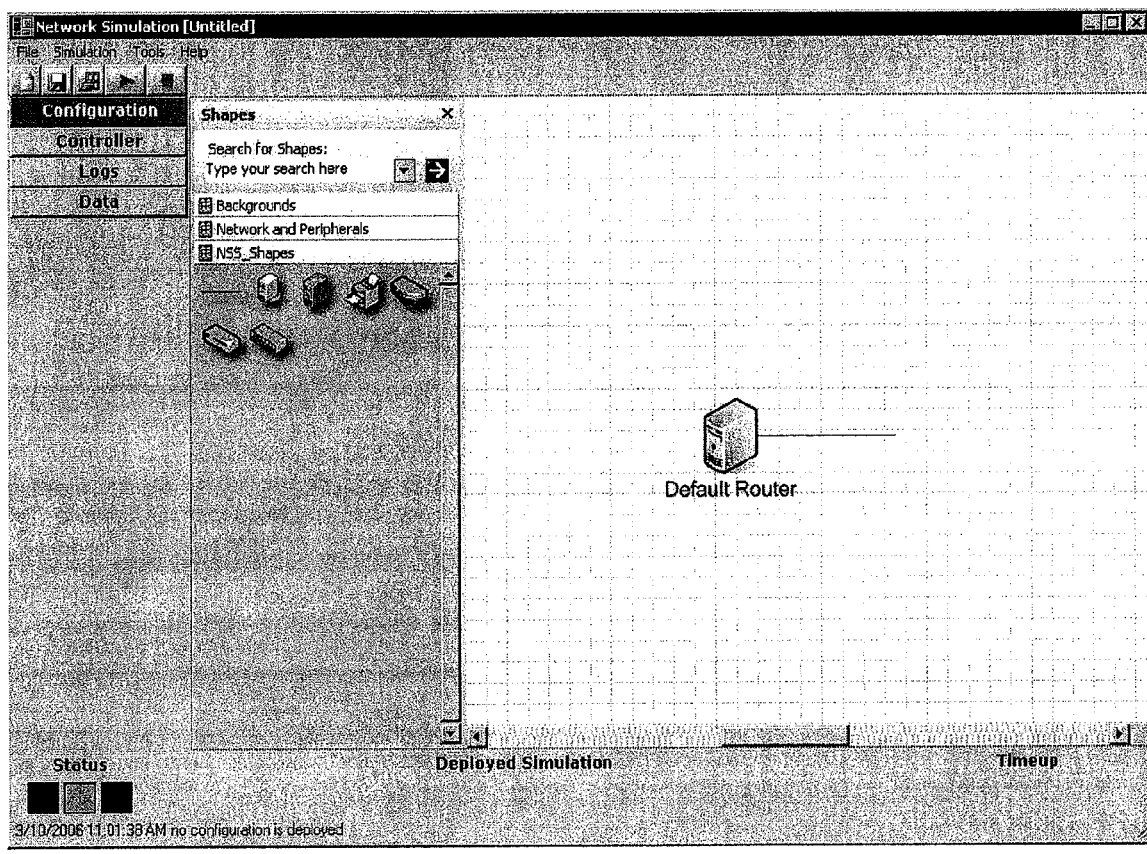
Figure 10C:
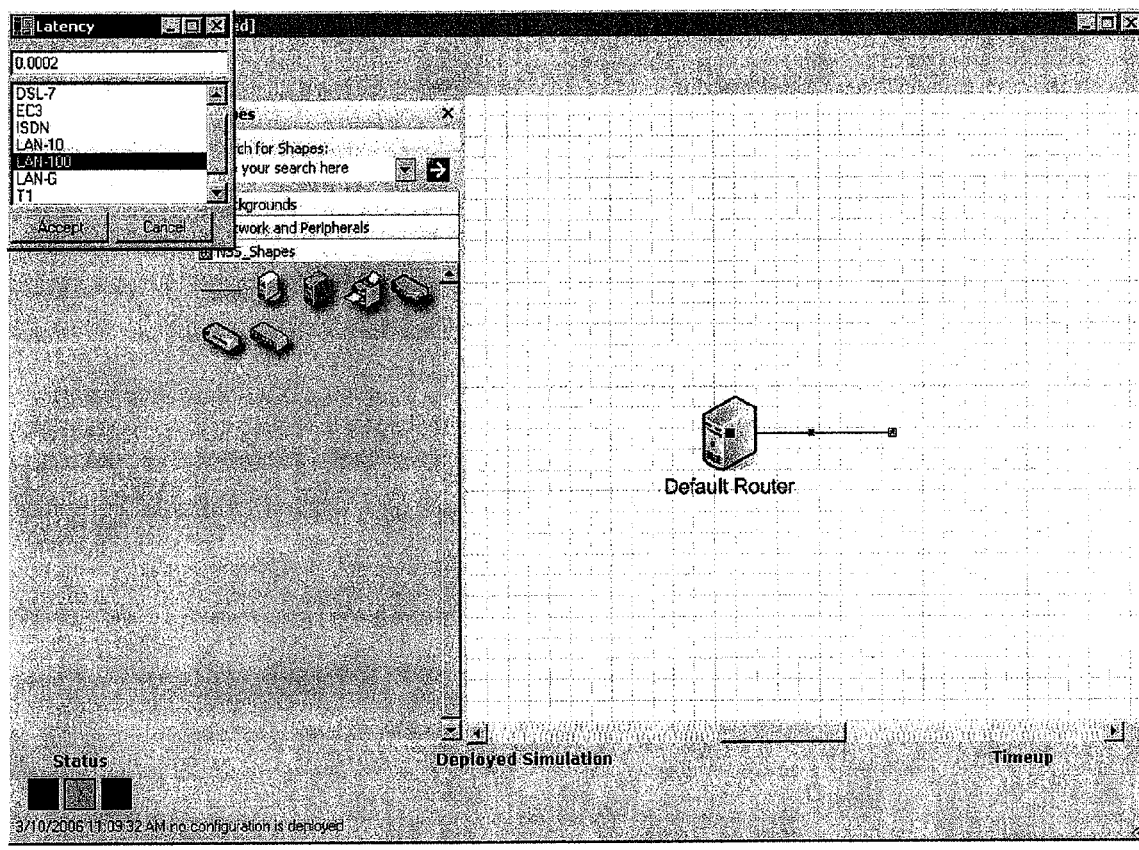

The following series of figures (FIGS. 10A-10E) illustrate the process for building a target network in an exemplary embodiment. In FIG. 10A, a user selects a "configuration" button on the client and a screen similar to that of FIG. 10A is displayed. The user then selects "File-->New" from the menu bar and a screen similar to that of FIG. 10B is displayed, which depicts information regarding network simulation configurations. The target networks originate from the classroom-facing IP address of the NSS 800. That IP address is assigned to the default router (as shown in FIG. 10B), which is the starting point for all network configurations. In FIG. 10C, the configuration of the Virtual Connection is depicted, such as in response to the user left-clicking on the "Virtual Connection" on the default router and then right-clicking on it. The user may configure the latency manually via the upper textbox shown in FIG. 10C, or choose on the pre-built link types, which include a latency setting. In this embodiment, latency may be a configurable Virtual Connection attribute. In addition or alternatively, configurable Virtual Connection attributes may be packet loss rate, jitter, and other attributes.

Figure 10D:
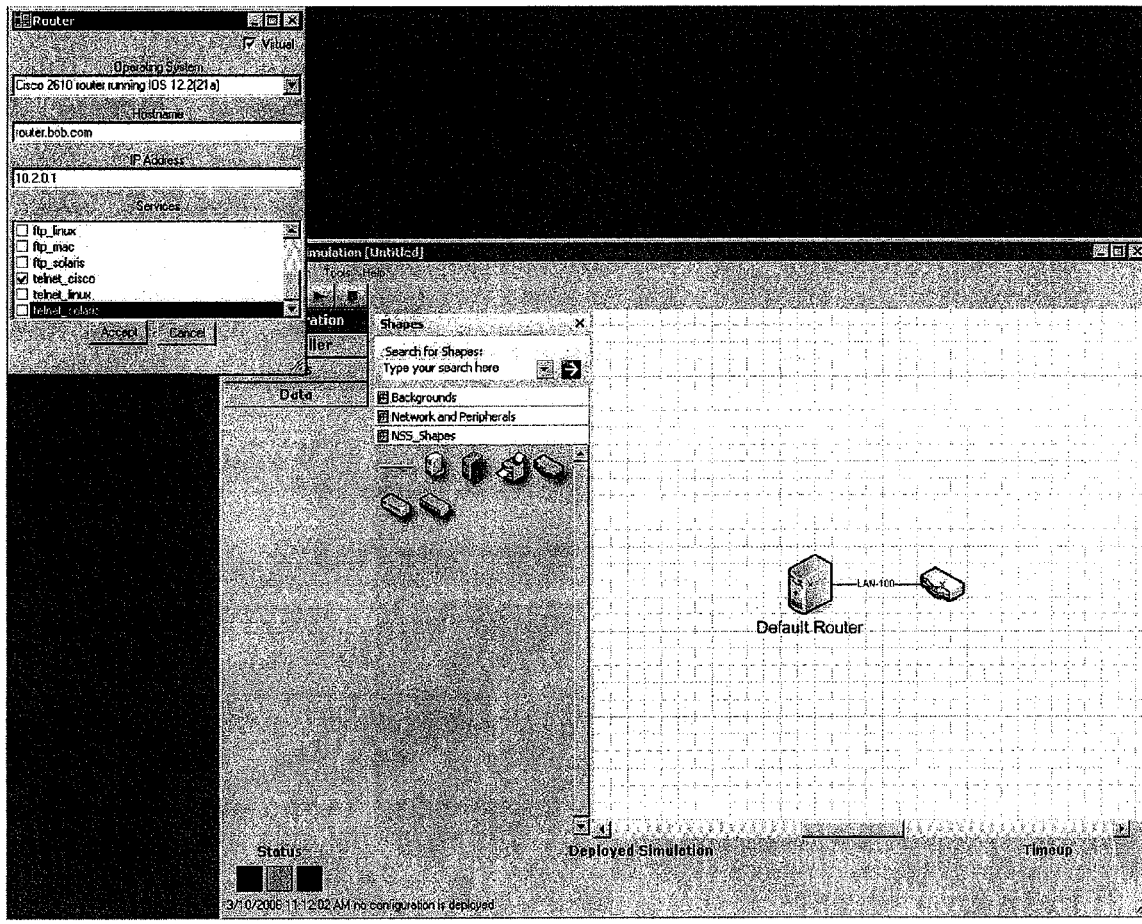
Figure 10E:
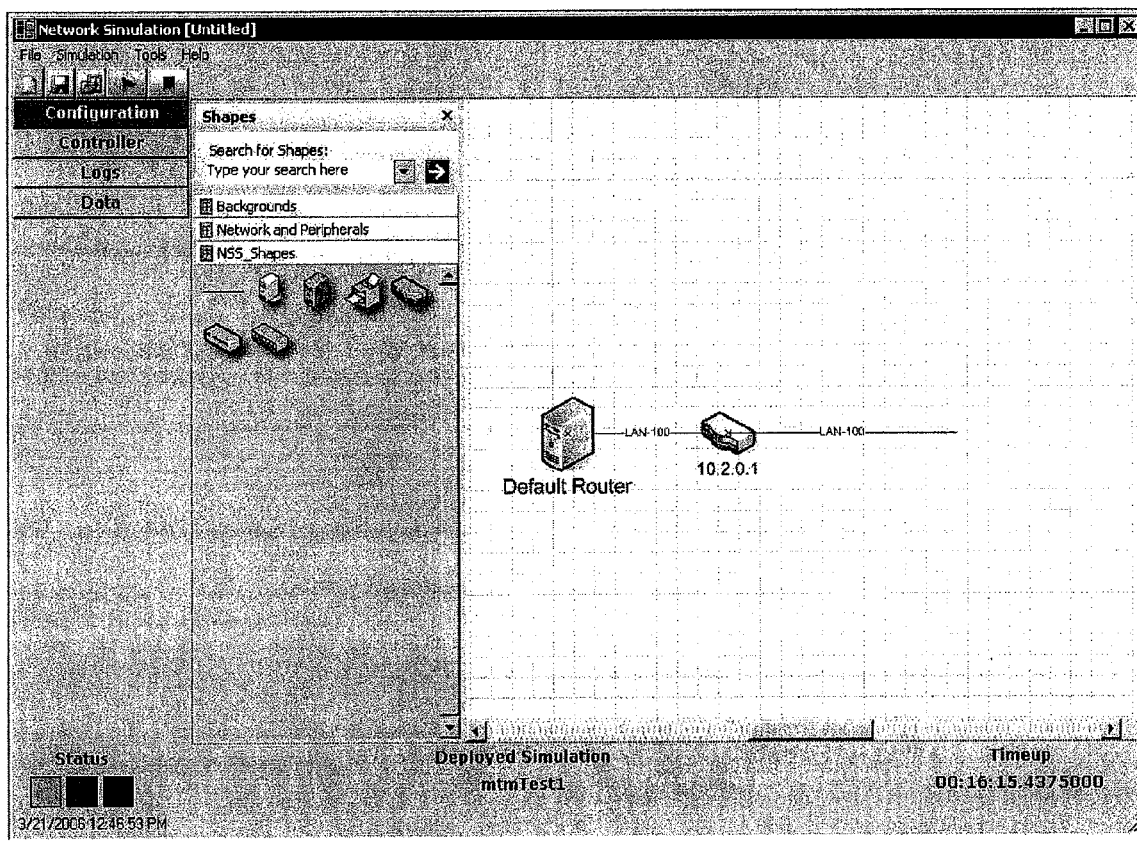

In FIG. 10D, a "router" object is selected and dragged into the design window and connected to the Default Router object via the provided Virtual Connection. This may be accomplished by left-clicking on the router object, then right-clicking on it. This will bring up a dialog menu to configure the router. A router object is a device that is configured with two or more interfaces and provides access for other devices. A router does not represent any specific operating system. The system does no error checking regarding assignment of operating system functions to routers. For example, if you configure a Cisco router with Solaris chargen you will get a Cisco router with Solaris chargen. FIG. 10E illustrates the step of adding (another) Virtual Connection. In this screen the user finds the Virtual Connection object in the Shapes pane, drags the Virtual Connection into the design window, attaches it to the router, and configures it as was done with the previously-described Virtual Connection. The process illustrated in FIGS. 10C through 10E continues until a virtual target network is created such as the exemplary one illustrated in FIG. 11.

Though not shown in FIGS. 10A-10E, in one embodiment the "drag and drop" devices and network components include a virtual intrusion detection system (VIDS) and a virtual firewall. These features are useful for the teaching of undetectable probing techniques. A VIDS device can be placed into a virtual network via the NMS, such as by dragging and dropping. Once placed into a virtual network, the VIDS may log the traffic that passes through its place in the virtual path. The traffic may be logged to an integrated interface on the NMS. Like a VIDS device, a virtual firewall is a device that can be placed into a virtual network via the NMS. Once placed into the virtual network, the firewall acts as if it was placed in that specific place in an actual network, filtering traffic accordingly. These virtual firewall devices may also work in concert with each other when placed along a serial path as determined by shortest-path-first routing.

Figure 11:
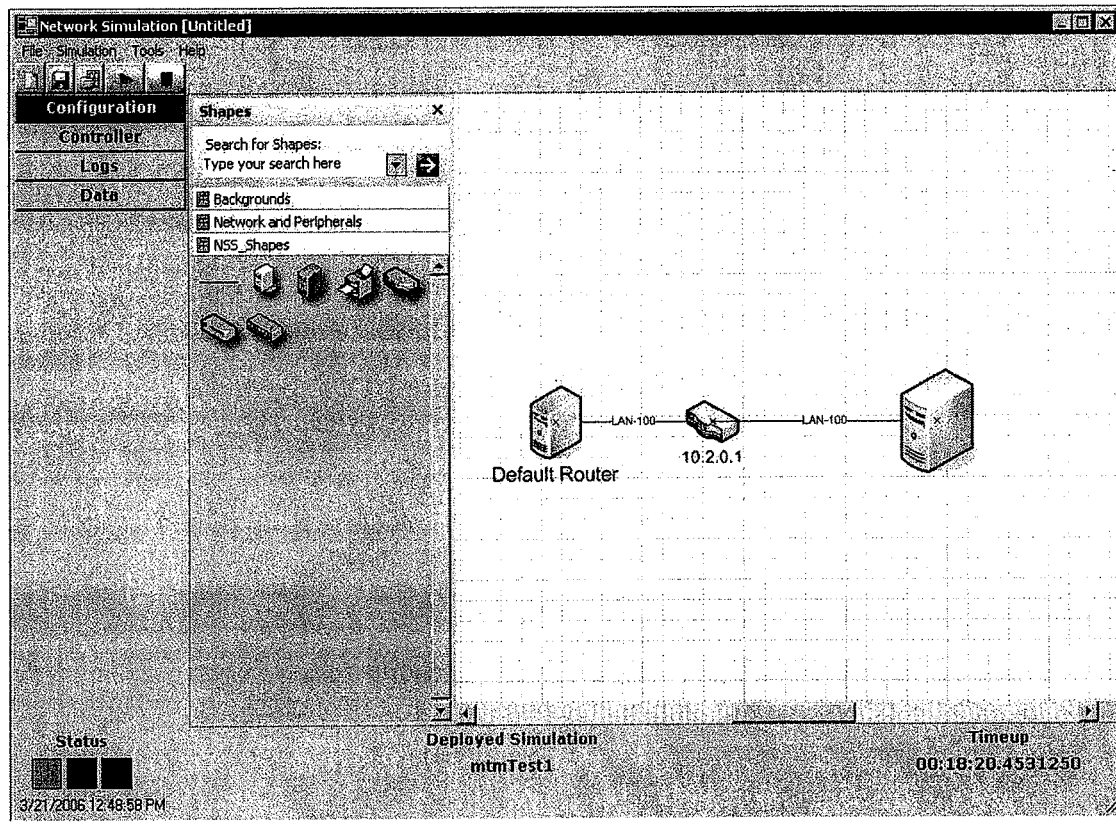
FIG. 11 is an exemplary virtual target network constructed through the process illustrated in FIGS. 10A through 10E.

The exemplary virtual target network illustrated in FIG. 11 is configured by dragging and dropping icons onto the network map. Links among network elements are configured with user-defined latency values. Hosts are configured by operating system, release and services offered. The simulator checks a completed design for errors to ensure, for example, that there are no open-ended links. Validated designs can be deployed to the simulator and probed using IO tools, such as Nmap and Ethereal. The system maintains a log of all packets that can be reviewed at the end of an exercise.

Figure 12:
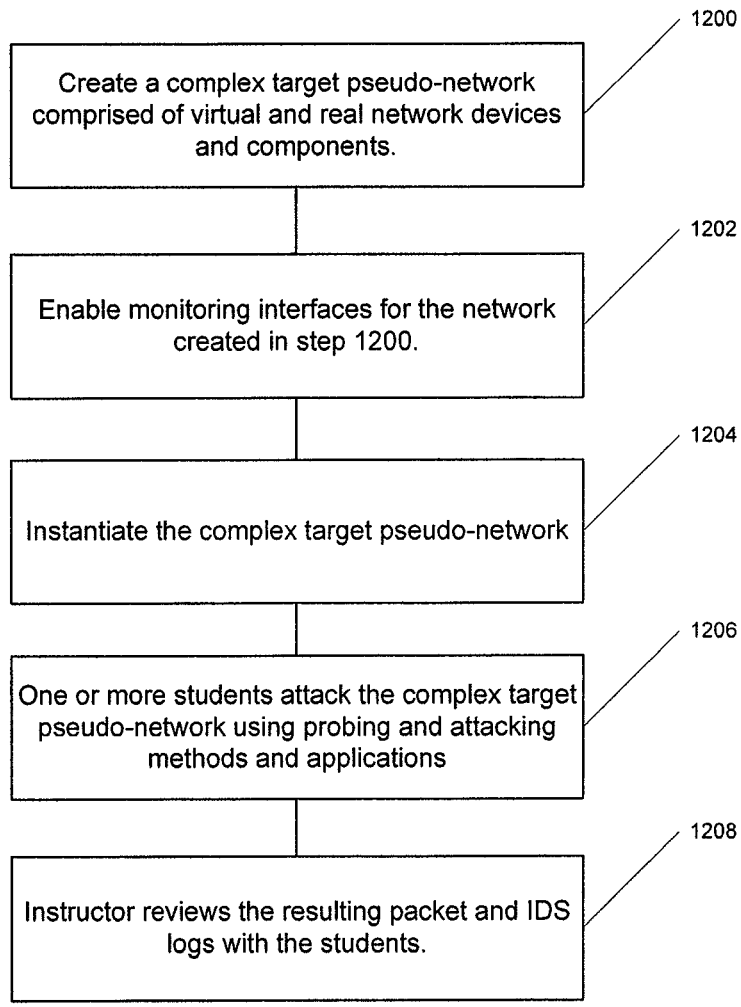
FIG. 12 is a flowchart illustrating an exemplary process for teaching network intrusion prevention and attack techniques.

FIG. 12 illustrates an exemplary process for teaching network intrusion prevention and attack techniques. The process starts at step 1200 where a complex target pseudo-network is created using an embodiment of the computer program product described above. The complex target pseudo-network may be comprised of virtual and real network devices and components. At step 1202, an instructor enables monitoring interfaces for the constructed complex target pseudo-network. At step 1204, the instructor instantiates the complex target pseudo-network. At step 1206, one or more students attack the complex target pseudo-network using probing and attacking methods and applications described herein. At step 1208, the instructor reviews the resulting packet and IDS logs with the students. Though not shown as a step of FIG. 12, in one embodiment the system has the functionality to replay the teaching exercise in support of iterative development of counterattack and defense techniques.

It is understood that the operations described for the illustrated method of FIG. 12 may be performed through hardware, software, or a combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. For example, the executable portions may be stored in memory of the student and/or instructor workstations of FIGS. 2 and 4 and/or the memory of the network simulator, such as the memory of the NMS and NSS, such that the respective processors of the student and instructor workstations and the NMS and NSS may access and execute the executable portions of the computer program product in order to perform the functions described herein including, for example, those attributed to the various modules of the NMS and NSS as depicted in FIGS. 7-9 and described above.

In the preceding specification, various embodiments have been described. It will, however, be evident that various modifications and changes may be made thereunto without departing from the broader spirit and scope of the invention as set forth in the claims that follow. For instance, in one embodiment reverse engineering of existing networks and designs is provided such that an enumeration of an existing network or a design for a new network could be processed into a configuration file that could then be used to construct and test the network using the disclosed system, method and computer program product. The specification and drawings are accordingly to be regarded as an illustrative rather than restrictive sense.

That which is claimed:

1. A method comprising:
creating a target network comprising simulated network targets and actual network devices, each simulated network target being configured to simulate an actual network device;
permitting probing of the target network including both the simulated network targets and the actual network devices;
providing responses to the probing based on a fingerprint of a specified operating system to mimic the specified operating system responses to the probing, the fingerprint obtained using reverse engineered scanning software code;
permitting development of counterattack techniques by a user communicatively coupled to the target network via a computing device;
permitting development of network defense techniques; and
providing functionality to replay a teaching exercise allowing iterative development of counterattack and defense techniques.

2. The method of claim 1 wherein configuring the simulated network targets comprises defining responses from the simulated network targets to be appropriate for a respective operating system.

3. The method of claim 1 wherein creating the target network comprises defining latency via virtual connections between the simulated network targets and the actual network devices.

4. The method of claim 1 wherein creating the target networks comprises dragging and dropping an icon representative of a simulated network target onto a network map.

5. The method of claim 1 wherein probing of the target network comprises permitting use of forensic tools.

6. The method of claim 1 wherein creating the target network comprises performing autodiscovery of actual network devices attached to the target network.

7. The method of claim 2, wherein defining responses comprising using a database of scanning source code to produce an appropriate response of a simulated network target in response to a probe.

8. A system comprising:
a network simulator configured to simulate a target network comprising simulated network targets and actual network devices, each simulated network target being configured to simulate an actual network device, wherein simulating an actual device includes providing responses to probing based on a fingerprint of a specified operating system to mimic the specified operating system responses to the probing, the fingerprint obtained using reverse engineered scanning software code; and
at least one workstation in communication with the network simulator and configured to probe the target network including both the simulated network targets and the actual network devices, wherein the workstation is configured to permit development of counterattack techniques by a user of the workstation, and wherein the workstation is configured to permit development of network defense techniques, the workstation being further configured to provide functionality to replay a teaching exercise allowing iterative development of counterattack and defense techniques.

9. The system of claim 8 further comprising an instructor workstation in communication with the network simulator and configured to monitor probing of the target network.

10. The system of claim 8 wherein the network simulator comprises a network simulation engine, a device simulation engine configured to perform pseudo-services, pseudo-routing, and fingerprinting, an actual device management module configured to perform configuration verification and actual-device and simulation-device integration, and an intrusion detection system.

11. The system of claim 10 wherein the network simulator further comprises a packet logging module.

12. The system of claim 8, wherein the network simulator is further configured to simulate network targets using a database of scanning source code to produce an appropriate response of a simulated network target in response to a probe.

13. A computer program product comprising a computer-readable storage medium having computer-readable program code portions stored therein, the computer-readable program code portions comprising:

a first executable portion for creating a target network comprising simulated network targets and actual network devices, each simulated network target being configured to simulate an actual network device;

a second executable portion for permitting probing of the target network including both the simulated network targets and the actual network devices;

a third executable portion for permitting development of counterattack techniques by a user communicatively coupled to the target network via a computing device;

a fourth executable portion for permitting development of network defense techniques by a user communicatively coupled to the target network via a computing device; and a fifth executable portion providing responses to the probing based on a fingerprint of a specified operating system to mimic the specified operating system responses to the probing, the fingerprint obtained using reverse engineered scanning software code;

wherein the first executable portion is further configured to provide functionality to replay a teaching exercise allowing iterative development of counterattack and defense techniques.

14. The computer program product of claim 13, wherein the first executable portion is further configured to define responses from the simulated network targets to be appropriate for a respective operating system.

15. The computer program product of claim 13 wherein the first executable portion is further configured to define latency via virtual connections between the simulated network targets and the actual network devices.

16. The computer program product of claim 13 wherein the first executable portion is further configured to drag and drop an icon representative of a simulated network target onto a network map.

17. The computer program product of claim 13 wherein the second executable portion is further configured to permit use of forensic tools.

18. The computer program product of claim 13 wherein the first executable portion is further configured to perform autodiscovery of actual network devices attached to the target network.

19. The computer program product of claim 14, wherein the first executable portion is further configured to use a database of scanning source code to produce an appropriate response of a simulated network target in response to a probe.

* * * * *